United States Patent [19]

Urabe et al.

[11] Patent Number: 5,172,248
[45] Date of Patent: Dec. 15, 1992

[54] METHOD FOR FORMING HALFTONE SCREEN AND APPARATUS THEREFOR

[75] Inventors: Hitoshi Urabe; Seiichiro Morikawa, both of Kaisei, Japan

[73] Assignee: Fuji Photo Film Co., Ltd., Kanagawa, Japan

[21] Appl. No.: 630,809

[22] Filed: Dec. 24, 1990

Related U.S. Application Data

[63] Continuation of Ser. No. 353,419, May 18, 1989, abandoned.

[30] Foreign Application Priority Data

May 18, 1988 [JP] Japan .................... 63-121392

[51] Int. Cl.⁵ .................... H04N 1/40; H04N 1/46
[52] U.S. Cl. .................... 358/456; 358/75; 358/296; 358/298; 358/453
[58] Field of Search .............. 358/429, 451, 454, 455, 358/456, 459, 460, 75, 80, 409, 410, 411, 412, 296, 298; 346/108, 160

[56] References Cited

U.S. PATENT DOCUMENTS

| | | | |
|---|---|---|---|
| 4,547,814 | 10/1985 | Hirosawa | 358/75 |
| 4,691,241 | 9/1987 | Tomohisa et al. | 358/409 |
| 4,717,925 | 1/1988 | Shibata et al. | 358/296 |
| 4,837,588 | 6/1989 | Imakawa et al. | 346/108 |
| 4,939,590 | 7/1990 | Tada | 358/454 |
| 5,019,896 | 5/1991 | Shimazaki | 358/80 |

FOREIGN PATENT DOCUMENTS

0235631A2 9/1987 European Pat. Off.
2026283A 1/1980 United Kingdom.

Primary Examiner—Edward L. Coles, Sr.
Assistant Examiner—Jerome Grant, II
Attorney, Agent, or Firm—Sughrue Mion Zinn Macpeak & Seas

[57] ABSTRACT

This invention is a method for forming halftone screen to prepare a multi-color separated halftone gradation image which is printable and reproducible by superposing an image signal obtained by scanning an original comprising continuous-tone color images with a halftone screen signal generated electrically, which comprises the steps of exposing and scanning a light spot of a predetermined size at a predetermined pitch to form halftone dots, and changing the number of said pitch so as to obtain an arbitrary screen line number. Further, this invention relates to a light beam scanning apparatus for forming halftone screen to prepare a multi-color separated halftone gradation image which is printable and reproducible by superposing an image signal obtained by scanning an original comprising continuous-tone color images with a halftone screen signal generated electrically, which comprises a first laser diode for emitting a synchronizing laser beam, a second laser diode for emitting a recording laser beam, a galvanometer for inputting the synchronizing laser beam and the recording laser beam through a collimator and a mirror, a synchronizing signal generator and an image recording section for inputting laser beams reflected and deflected by said galvanometer, a PLL multiplier for outputting a synchronizing signal by inputting an electric signal from said synchronizing signal generator, and an output controlling section for driving the second laser diode in accordance with the image signal and the synchronizing signal.

10 Claims, 8 Drawing Sheets

METHOD FOR FORMING HALFTONE SCREEN AND APPARATUS THEREFOR

This is a Continuation of Application No. 07/353,419 filed May 18, 1989 now abandoned.

BACKGROUND OF THE INVENTION

1. Field of the Invention

This invention relates to a method for forming a halftone screen for color scanners of a flat bed type and the like and to an apparatus therefor, and more particularly to a method and an apparatus for forming a halftone screen with an arbitrary number of screen lines by a system which exposes and scans a light spot of a predetermined size at a predetermined pitch, and outputs the result from a recording section to thereby form 4-color separated halftone images. The 4-color separated halftone image formation is conducted by superposing an image signal which is obtained by scanning an original comprising color images of continuous-tone with a halftone screen signal generated electrically so that the original is reproducible in the four colors of C (cyan), M (magenta), Y (yellow) and K (black).

2. Description of the Prior Art

In the fields of printing and plate making, an image scanning/reading/recording system is widely used in recent years as they can electrically process image information of an original and prepare an original film plate for printing to thereby rationalize the work process and improve the image quality.

Such image scanning/reading/recording system comprises basically an input section, a control section and an output section. More particularly, the input section of the system picks up image signals by a lighting system, a color separation system and a photometry mechanism, and converts them into the image information photoelectrically. The control section arithmetically processes the image information for gradation correction, color correction, contour emphasis, conversion from R (red), G (green), B (blue) to C, M, Y, K and the like in accordance with plate-making conditions. Then, the processed image information is converted again at the output section into optical signals such as laser beams to record images on a recording carrier comprising a photosensitive material. Next, the recording carrier is subsequently developed by a predetermined developing device and used as the original film plate for printing and so on.

When the original is of continuous tone images such as a picture or a photograph, it is necessary to separate the original in dots to express the degree of density. The continuous tone image is converted into a halftone image which is a group of dots formed in different dimensions in accordance with the degree of density of the image. There has been proposed a method for separating an original into dots by placing a contact screen comprising dots in different gradations in a net form on a film and exposing the recording carrier with optical signals corresponding to the original continuous tone images. In the image scanning/reading/recording system, a halftone screen which is a counterpart of such contact screen may be formed electrically.

As a preferable example of the halftone screen formation method of the prior art, Japanese Patent Publication (KOKOKU) No. 49361/1977 will be briefly described.

FIG. 1 shows a prior art wherein the reference numeral 100 denotes a basic periodic section of an electrically formed halftone screen. The halftone screen is formed by repetition of the same pattern and the minimum unit of the pattern is the basic periodic section 100. The basic periodic section 100 comprises eight scanning lines $S_1$ through $S_8$ which are arranged in the direction of Y in parallel to each other. Each part of the section 100 is defined with voltage signals unique to the scanning lines $S_1$ through $S_8$ which respectively change along the recording direction X. The respective voltages of the scanning lines $S_1$, $S_2$, $S_4$ and $S_5$ are set at high voltages when they are passing a point A to a point D in a dot 101 while the voltage of the scanning line $S_3$ at the point E is set low. The voltages of the scanning lines $S_1$ through $S_5$ are set to gradually decrease from the points A through D toward the point E. The voltage signals of the scanning lines $S_1$ through $S_8$ can form halftone screen signals of the respective scanning lines by superposing a plurality of alternating voltage signals of different periods and of a triangle shape, and by gradually shifting the phase thereof for each scanning line.

When multi-colored images are converted into dots for reproduction, it is necessary to generate a plurality of halftone screens and to superpose thus formed halftone gradation images. Each halftone screen is rotated by a predetermined angle $\theta$ from the recording direction X in order to prevent generation of Moiré pattern when the halftone images are superposed.

The basic periodic section 100 is generated periodically at a frequency sufficient to cover all the scanning zones of the original to form the halftone screen. The halftone screen signals which form the halftone screen are superposed with the image signals which are read out from the original optically at the input section of the image scanning/reading/recording system to form the halftone images on the original film plate.

A halftone plate for color printing of an area modulation type can be identified with the number of screen lines (e.g. line number/inch, LPI), screen angle (m/n) and dot patterns. The screen angle is a rational number defined by m/n shown in FIG. 1, and is necessary for each of the four colors of C, M, Y and K. The screen angle and the dot pattern may be formed by the technique disclosed in the above Japanese Patent Publication No. 49361/1977. The screen line number may be obtained arbitrarily for the color scanner of a drum type by simply changing the magnification with an optical zoom. However, it is not easy to use an optical zoom for the color scanner of a flat bed (plane) type. Due to its high speed processing, the color scanner of a flat bed type is required to conduct main scanning of light spots optically, and an addition of a zooming mechanism to the system is almost impossible. The control system will further become complicated and larger, if the size of a light spot or pitch is changed.

SUMMARY OF THE INVENTION

This invention was conceived to eliminate such problems encountered in the prior art and aims to provide methods and apparatus for forming a halftone screen with an arbitrary number of screen lines without the necessity for changing the size and the scanning pitch of the light spots in the flat type color scanner.

According to one aspect of this invention, for achieving the objects described above, there is provided a method for forming a halftone screen, and aforementioned objects of this invention is achieved by forming a multi-color separated halftone gradation image which is printable and reproducible by superposing an image signal obtained by scanning an original comprising continuous-tone color images with a halftone screen signal generated electrically, which comprises the steps of exposing and scanning a light spot of a predetermined size at a predetermined pitch to form halftone dots, and changing the number of said pitch so as to obtain an arbitrary screen line number.

According to another aspect of this invention, there is provided a method for forming a halftone screen to prepare a multi-color separated halftone gradation image which is printable and reproducible by superposing an image signal obtained by scanning an original comprising continuous-tone color images with a halftone screen signal generated electrically, which comprises the steps of preparing screen angle m/n of a rational number and constants a and $\gamma$ of integer, obtaining a relation $a = (m^2 + n^2)/n.\gamma$, preparing integers $n_o$, $m_o(<n_o)$, $a_o a_i$, obtaining a relation $(m, n, a) = (m_o, n_o, a_o)$ of near halftone angle 15°, a relation $(m, n, a) = (n_o, m_o, a_o)$ of near halftone angle 75° and a relation $(m, n, a) = (1, 1, a_1)$ of halftone angle 45°, preparing a scanning pitch p, obtaining a period K of Moiré pattern as $K = p.a_o/\{\sqrt{2}(n_o - m_o)\}$, obtaining a relation $a_o = (n_o - m_o).a_1$ in accordance with a condition that a period of a primary Moiré pattern is perfectly equal to a period of 45° screen, and calculating a screen line number which is usable as a predetermined value being said scanning pitch p.

Further, according to still another aspect of this invention, there is provided a method for forming a halftone screen to prepare a multi-color separated halftone gradation image which is printable and reproducible by superposing an image signal obtained by scanning an original, comprising continuous-tone color images, with a halftone screen signal generated electrically, which comprises the steps of exposing and scanning a light spot of a predetermined size at a predetermined pitch to form halftone dots, changing the number of said pitch so as to obtain arbitrary screen line number, and changing the pitch at the screen line number where Moiré pattern is formed so that no Moiré pattern is formed for all screen line numbers.

Still further, according to another aspect of this invention, there is provided a light beam scanning apparatus for forming a halftone screen to prepare a multi-color separated halftone gradation image which is printable and reproducible by superposing an image signal obtained by scanning an original comprising continuous-tone color images with a halftone screen signal generated electrically, which comprises a first laser diode for emitting a synchronizing laser beam, a second laser diode for emitting a recording laser beam, a galvanometer for inputting the synchronizing laser beam and the recording laser beam through a collimator and a mirror, a synchronizing signal generator and an image recording section for inputting laser beams reflected and deflected by said galvanometer, a PLL multiplier for outputting a synchronizing signal by inputting an electrical signal from said synchronizing signal generator, and an output controlling section for driving the second laser diode in accordance with the image signal and the synchronizing signal.

According to still another aspect of this invention, there is provided a halftone gradation image signal generating apparatus for forming halftone screen to prepare a multi-color separated halftone gradation image which is printable and reproducible by superposing a continuous-tone image signal obtained by scanning an original comprising continuous-tone color images with a halftone screen signal generated electrically, which comprises a first counter to count a clock signal of a main scanning direction of the continuous-tone image signal and to output a first address signal, a second counter to count a clock signal of an auxiliary scanning direction of the continuous-tone image signal and to output a second address signal, a halftone data memory which stores desired data out of plural halftone original data predetermined in accordance with levels of a screen angle and halftone resolution which have been transferred, an address converting section which accesses said halftone data memory in accordance with the first and the second address signals, a line memory which inputs the continuous-tone image signal and the clock signal of the main scanning direction and then stores them, and a binary signal generating section which outputs a halftone gradation image signal by comparing an output of said halftone data memory and an output of said line memory.

The nature, principle and utility of the invention will become more apparent from the following detailed description when read in conjunction with the accompanying drawings.

BRIEF DESCRIPTION OF THE DRAWINGS

In the accompanying drawings:

FIG. 7 is a chart to show an example of halftone data having line number 170 LPI;

FIG. 9 is an explanatory view of the halftone screen signal;

PREFERRED EMBODIMENTS OF THE INVENTION

Figure 5:
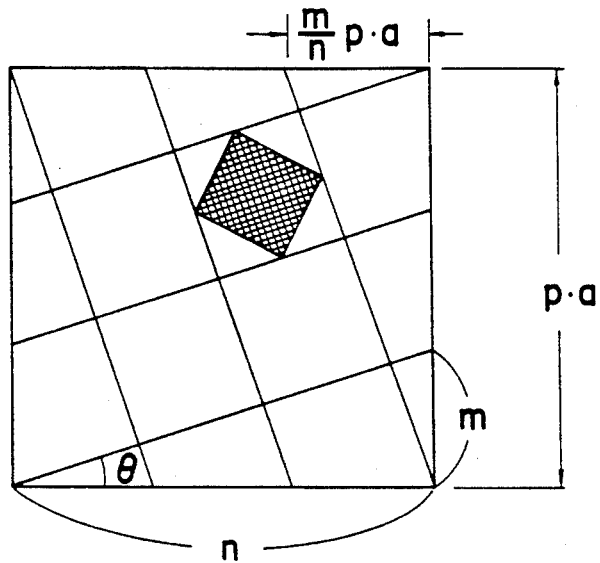
FIG. 5 is a view to show halftones formed by rational tangent.

It is assumed that the screen angles for four plates of C, M, Y and K are selected at 0°, 15°, 45° and 75°, and the Y plate is set at the angle 0° while other three plates of C, M and K are optionally set at the angles 15°, 45° and 75°. The Moiré pattern caused by the Y plate is not recognizable visually, and it is empirically known that only the Moiré pattern which may be caused by the other three plates have to be considered. If the screen is formed by a rational tangent for the screen angles 15° and 75°, when the relation $m/n = \frac{1}{3}$ holds as shown in FIG. 5, the angles will exactly become 18.4° and 71.6°. The two angles 15° and 75° are symmetrical from the angle 45°.

The primary Moiré pattern caused by the screen angles of 15° and 75° is discussed below.

Figure 1:
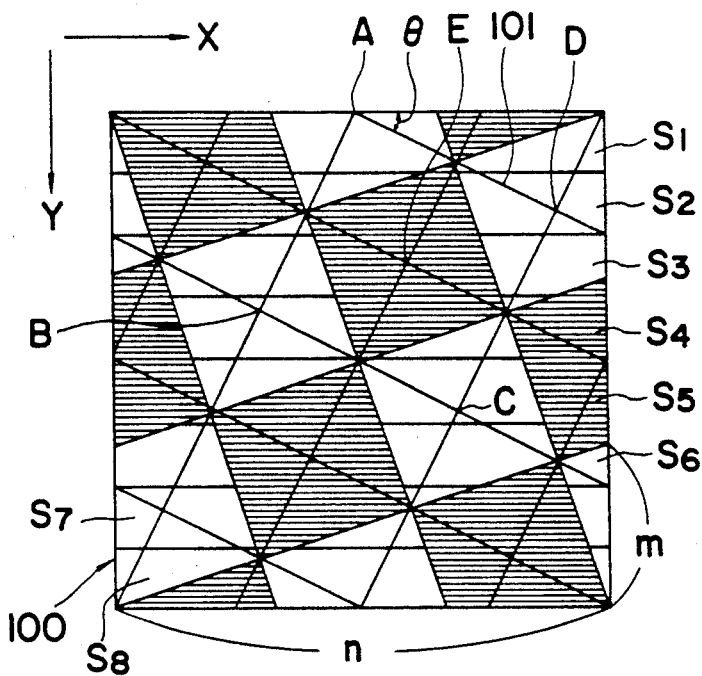
FIG. 1 is a view to show a basic periodic section of a halftone screen.
Figure 2:
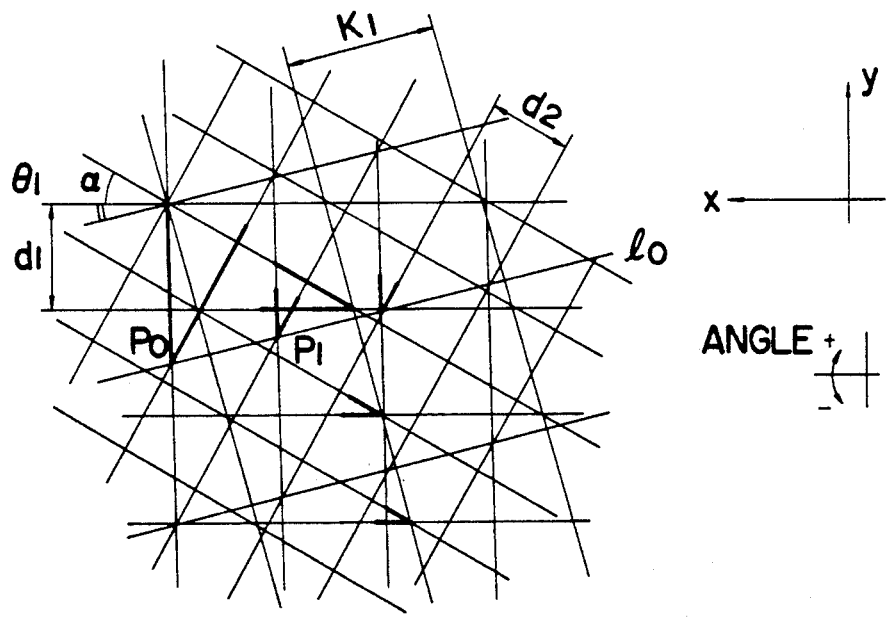
FIGS. 2 and 3 are views to show examples of patterns respectively.
Figure 3:
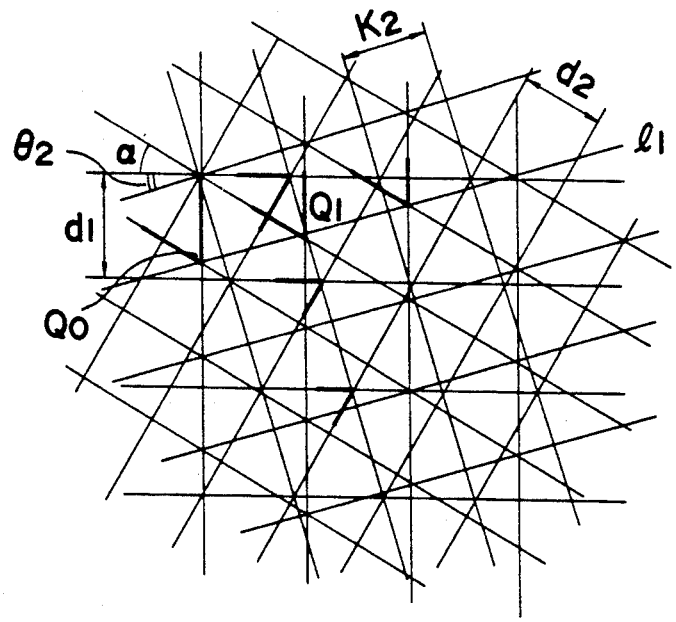

If it is assumed that the period of the first screen is denoted as $d_1$, that of the second screen as $d_2$, and the angle formed by the above two screens as $\alpha$, referring to FIGS. 2 and 3, Moiré pattern of period of $K_1$ is formed at an angle $\theta_1$ from the horizontal line in FIG. 2 while that of period $K_2$ is formed at an angle $\theta_2$ in FIG. 3. Coordinate axes of x and y are plotted on the first screen as the reference. In FIG. 2 the coordinates of points $P_o$ and $P_1$ become as follows.

$$\left.\begin{array}{c} P_0(0,p_0) \\ P_1(-d_1,p_1) \end{array}\right\} \tag{1}$$

$$p_0 = -d_2/\sin\alpha \tag{2}$$
$$p_1 = 2p_0 + d_1 \cdot \cot\alpha \tag{3}$$

The inclination of the straight line $l_o$ connecting the points $P_o$ and $P_1$ is expressed as below.

$$\tan\theta_1 = \frac{p_0 - p_1}{d_1} = \frac{d_2 - d_1 \cdot \cos\alpha}{d_1 \cdot \sin\alpha} \tag{4}$$

$$K_1 = |p_0 \cdot \cos\theta_1| \tag{5}$$
$$= \left|\frac{d_2}{\sin\alpha} \cdot \cos\left(\tan^{-1}\frac{d_2 - d_1 \cdot \cos\alpha}{d_1 \cdot \sin\alpha}\right)\right|$$

Similarly, in FIG. 3, the coordinates of the points $Q_o$ and $Q_1$ can be expressed as below.

$$\left.\begin{array}{c} Q_0(0,q_0) \\ Q_1(-d_1,q_1) \end{array}\right\} \tag{6}$$

$$q_0 = -d_2/\cos\alpha \tag{7}$$
$$q_1 = -d_1 \cdot \tan\alpha \tag{8}$$

The inclination of the straight line $l_1$ connecting the points $Q_o$ and $Q_1$ is expressed as below.

$$\tan\theta_2 = \frac{q_0 - q_1}{d_1} = \frac{d_1 \cdot \sin\alpha - d_2}{d_1 \cdot \cos\alpha} \tag{9}$$

$$K_2 = |q_0 \cdot \cos\theta_2| \tag{10}$$
$$= \left|\frac{d_2}{\cos\alpha} \cdot \cos\left(\tan^{-1}\frac{d_1 \cdot \sin\alpha - d_2}{d_1 \cdot \cos\alpha}\right)\right|$$

Figure 4:
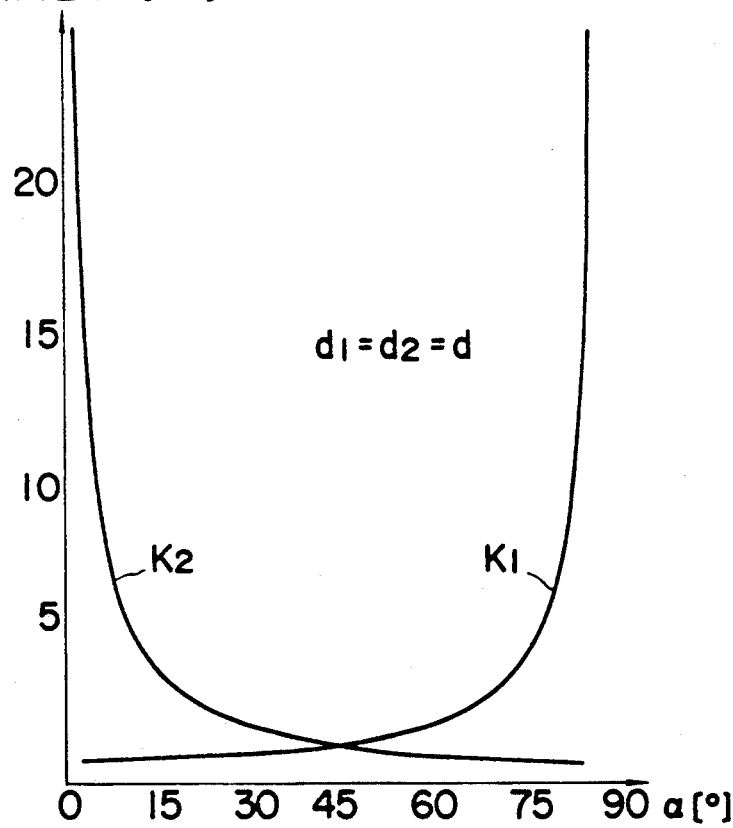
FIG. 4 is a view to show the period of the Moiré pattern as shown in FIGS. 2 and 3.

If $K_1$ and $K_2$ are plotted as the relation $d_1=d_2=d$ holds, the relation shown in FIG. 4 is obtained. If the Moiré patterns are formed at the locations with short periods, they are fine Moirés patterns and tolerable. However, with a period exceeding a certain degree, they will become conspicuous patterns. It is therefore desirable to limit the angles $\alpha$ formed by the two screens within $\pm 15°$ from the center or 45°, or in the scope ranging from 30° to 60°.

The mechanism to form the Moiré pattern is now discussed from the relation between the primary Moiré pattern at 45° which is caused by superposing two plates (15° and 75°) and the screen of 45° or the third plate.

As shown in FIG. 5, parameters of rational tangent are given by three of (m, n, a) and the angle of $m < n$ corresponding to 15° and 75° will be respectively $\tan^{-1}(m/n)$ and $\tan^{-1}(n/m)$. If it is assumed that p denotes a scanning pitch and a a constant of an integer, the square of p×a becomes the minimum unit of repetition patterns. The numbers m, n and a are integers and the numerical values corresponding to them should satisfy the conditions to eliminate the single Moiré pattern disclosed in Japanese Patent Laid-open (KOKAI) No. 188564/1987 or the relation expressed by the equation below wherein $\gamma$ is an integer.

$$a = \frac{m^2 + n^2}{n} \cdot \gamma \tag{11}$$

The primary Moiré pattern formed by the two plates of $45° \pm (30° \pm \theta)$ (provided that 15° and 75° are nominal angles) is formed precisely at 45°. The sufficient condition for not causing the secondary Moiré pattern is that the period of the primary Moiré pattern coincides with the dot interval on the third plate or that of 45°. If the numerals $n_o$, $m_o$ ($<n_o$), $a_1$ $a_o$ are integers, it becomes (m, n, a)=$(m_o, n_o, a_o, a_i)$ at near 15°, (m, n, a)=$(n_o, m_o, a_o)$ at near 75° or symmetrical to the above, and (n, m, a)=$(1, 1, a_1)$ at 45° exactly. The line interval $d_{15}$ at 15° is represented by the equation (12) below.

$$d_{15} = \frac{p \cdot a_0}{\sqrt{m_0^2 + n_0^2}} \tag{12}$$

The line interval $d_{45}$ expressed as below.

$$d_{45} = p \cdot a_1/\sqrt{2} \tag{13}$$

The real angle $\theta_{15}$ at 15° is expressed as below.

$$\theta_{15} = \tan^{-1}(m_o/n_o) \tag{14}$$

The real angle $\theta_{75}$ at 75° is expressed as below.

$$\theta_{75} = \tan^{-1}(n_o/m_o) \tag{15}$$

If the primary Moiré pattern is formed in the direction 45° in the patterns of 15° and 75°, the relation of equations (16) and (17) holds.

$$\alpha = \theta_{75} - \theta_{15} \tag{16}$$

$$d_1 = d_2 = d_{15} \tag{17}$$

These equations are substituted in the above equation (5) to obtain the period K of the Moiré pattern as expressed below.

$$K = \frac{d_0}{(n_0^2 - m_0^2)/(m_0^2 + n_0^2)} \cdot \sqrt{\frac{(m_0 + n_0)^2}{2(m_0^2 + n_0^2)}} \tag{18}$$
$$= \frac{p \cdot a_0}{\sqrt{m_0^2 + n_0^2}} \cdot \frac{m_0^2 + n_0^2}{n_0^2 - m_0^2} \cdot \frac{m_0 + n_0}{\sqrt{2(m_0^2 + n_0^2)}}$$
$$= \frac{p \cdot a_0}{\sqrt{2}\,(n_0 - m_0)}$$

The condition to prevent the secondary Moiré pattern from being formed is that the period of the primary Moiré pattern coincides with the that of 45° screen completely, or in other words, the equations (13) and (18) completely agree to each other.

$$K = d_{45} \quad (19)$$

Then, the relation holds as below.

$$a_1 = \frac{a_0}{n_0 - m_0} \quad (20)$$

$$a_0 = (n_0 - m_0) \cdot a_1 \quad (21)$$

Table 1 shows calculated numbers of screen lines usable based on the above equation (21) assuming the scanning pitch of p=11.25 μm. The asterisk * represents combinations of relatively long periods in the Moiré pattern. Those without the asterisk denote combinations without Moiré pattern. The combinations marked with the asterisk * present less difficulty in practice as the period of Moiré pattern is long. Especially in the lines of 150 and 120, there are no combinations without Moiré pattern at the scanning pitch of 11.25 μm. The problem is solved by using the scanning pitch of 12.5 which is 10/9 folds of 11.25 μm. Then, the screen number of 150 and 120 lines is easily obtained without Moiré pattern. Table 2 shows combinations of screen line numbers obtained by using the scanning pitches of 22.5 μm, 11.25 μm and 12.5 μm.

Referring now to the attached drawings, description is given on a light beam scanning apparatus which can use this invention method.

Figure 6:
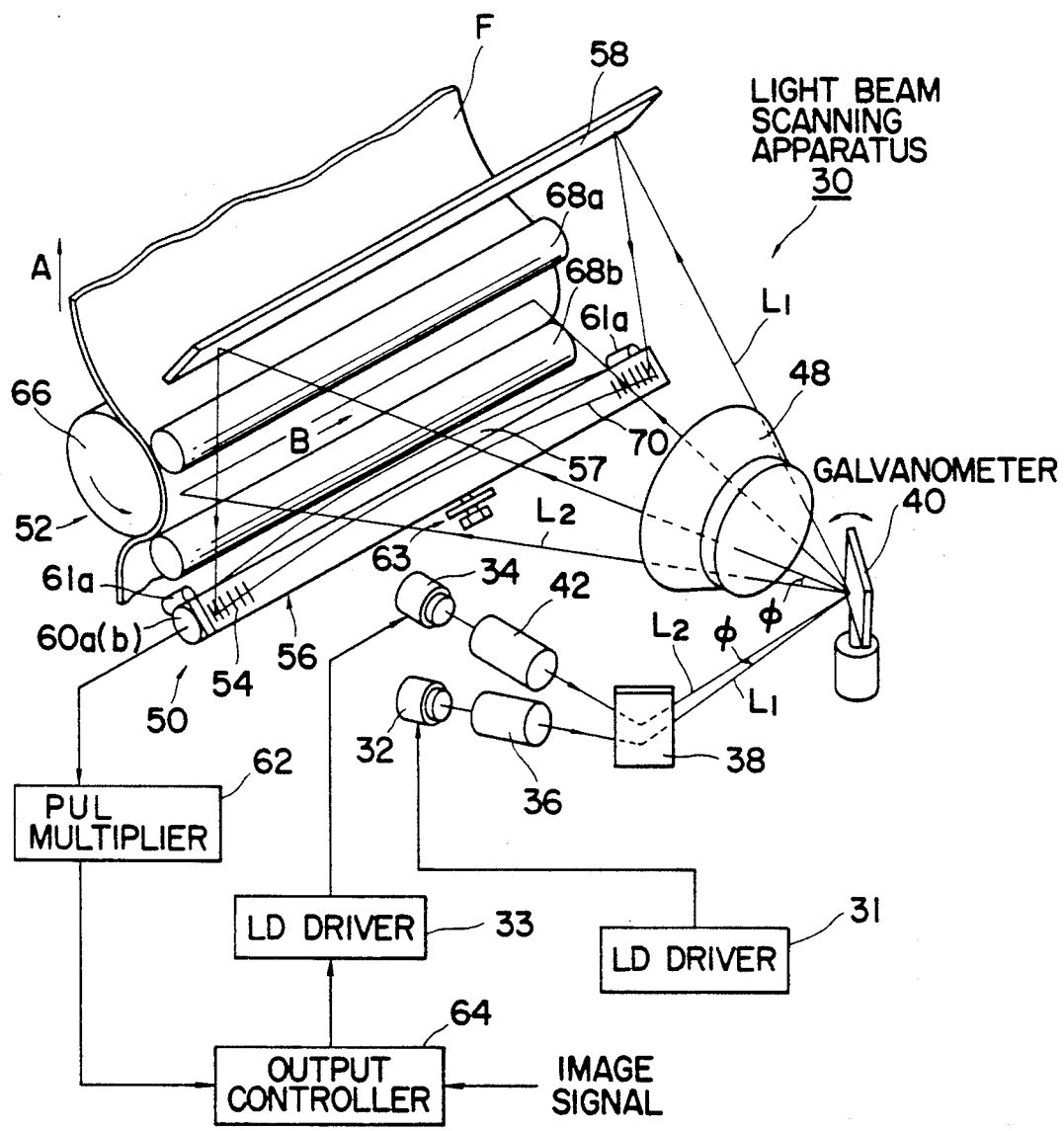
FIG. 6 is a structural view to show an embodiment of a light beam scanning system to which this invention method can be applied.

In FIG. 6, a light beam scanning apparatus 30 includes a laser diode 32 which emits a synchronizing laser beam $L_1$ when driven by an LD driver 31 and a laser diode 34 which emits a recording laser beam $L_2$ when driven by an LD driver 33. The light beam $L_1$ for synchronization output from the laser diode 32 is guided through a collimator 36 and a mirror 38 eventually to reach a galvanometer 40. The light beam $L_2$ for recording output from the laser diode 34 is directed through a collimator 42 and a mirror 38 toward the galvanometer 40, which is deviated from the laser beam $L_1$ by the angle $\phi$. The galvanometer 40 operatively reflects and deflects the laser beams $L_1$ and $L_2$ by oscillating the mirror at a high speed. Thus reflected and deflected laser beams $L_1$ and $L_2$ are respectively guided to a synchronizing signal generator 50 and an image recording section 52 via a scanning lens 48 comprising an f θ lens. The synchronizing laser beam $L_1$ enters the scanning lens 48 at an incident angle of $\phi$ from the optical axis and is directed to the synchronizing signal generator 50 via the periphery of the scanning lens 48. The recording laser beam $L_2$ enters the scanning lens 48 within the plane including the optical axis and is di-

TABLE 1

| nominal line number | 45° a. | real line number | 15°/75° mn/. | a. | real line number | real angle |
|---|---|---|---|---|---|---|
| 65 LPI | a = 50. | 63.9 LPI | ⅓ | a = 100. | 71.4 LPI. | 18.4°/71.6° |
| 65 LPI | a = 51. | 62.6 LPI | ⅓ | a = 153. | 60.8 LPI. | 14.0°/76.0° |
| 85 LPI | a = 40. | 79.8 LPI | ⅓ | a = 80. | 89.2 LPI. | 18.4°/71.6° |
| 100 LPI | a = 35. | 91.2 LPI | ⅓ | a = 70. | 102.0 LPI. | 18.4°/71.6° |
| *120 LPI | a = 27. | 118.3 LPI | 5/18 | a = 349. | 120.9 LPI. | 15.5°/74.5° |
| *120 LPI | a = 26. | 122.8 LPI | 5/17 | a = 314. | 127.4 LPI. | 16.4°/73.6° |
| 133 LPI | a = 25. | 127.7 LPI | ⅓ | a = 50. | 142.8 LPI. | 18.4°/71.6° |
| *150 LPI | a = 22. | 145.1 LPI | 4/15 | a = 241. | 155.4 LPI. | 4.9°/75.1° |
| 175 LPI | a = 20. | 159.6 LPI | ⅓ | a = 40. | 178.5 LPI. | 18.4°/71.6° |
| 175 LPI | a = 17. | 187.8 LPI | ⅓ | a = 51. | 182.5 LPI. | 14.0°/76.0° |

TABLE 2

| nominal line number LPI | pitch p (μm) | 0° $a_0$ | 0° $l_0$ | 45° $a_{45}$ | 45° $l_{45}$ | 15°/75° m/n | 15°/75° angle | 15°/75° $a_{15}$ | 15°/75° $l_{15}$ |
|---|---|---|---|---|---|---|---|---|---|
| 65 | 22.5 | 17 | 66.4 | 25 | 63.9 | ⅓ | 18.4°/71.6° | 50 | 71.4 |
| 85 | 22.5 | 13 | 86.8 | 20 | 79.8 | ⅓ | 18.4°/71.6° | 40 | 89.2 |
| 100 | 12.5 | 20 | 101.6 | 30 | 95.8 | ⅓ | 18.4°/71.6° | 60 | 107.1 |
| 120 | 12.5 | 17 | 119.5 | 25 | 114.9 | ⅓ | 18.4°/71.6° | 50 | 128.5 |
| 133 | 11.25 | 17 | 132.8 | 25 | 127.7 | ⅓ | 18.4°/71.6° | 50 | 142.8 |
| 150 | 12.5 | 14 | 145.1 | 20 | 143.7 | ⅓ | 18.4°/71.6° | 40 | 160.6 |
| 175 | 11.25 | 13 | 173.7 | 20 | 159.6 | ⅓ | 18.4°/71.6° | 40 | 178.5 |
| 200 | 12.5 | 10 | 203.2 | 15 | 191.6 | ⅓ | 18.4°/71.6° | 30 | 214.2 |

In Table 2, for the coarse screen line in the numbers of 65 and 85, the scanning pitch of 22.5 μm is used, which is twice as much as 11.25 μm. If selecting the scanning pitch P at 2.25 μm, then an arbitrary number of screen lines in four colors can be selected without Moiré pattern, but the scanning pitch of 2.25 μm is not realized easily due to the following two reasons. Firstly, it is extremely difficult to stop down the light beam (or light spot), at 2.25 μm, and secondly when the scanning pitch is set at 2.25 μm, the scanning speed decreases while the data capacity remarkably increases. Because of these two reasons, the selection of the scanning pitch as small as 2.25 μm is not recommendable.

rected to the image recording section 52 via the center of the scanning lens 48.

Figure 8:
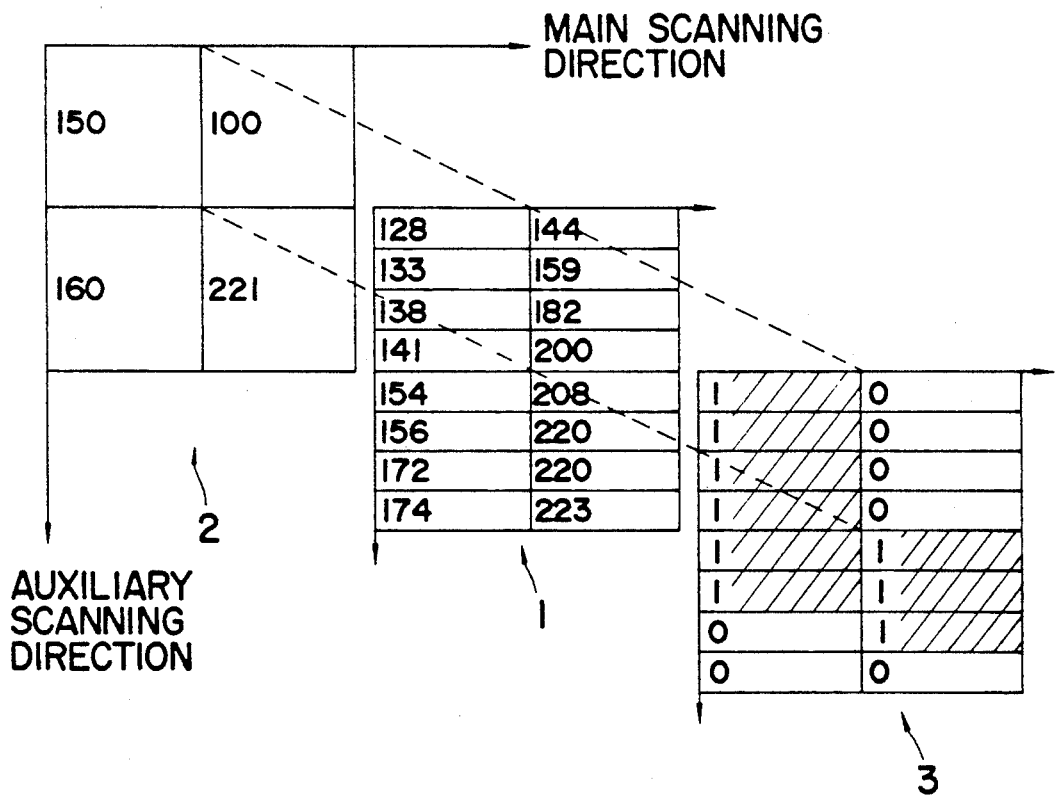
FIG. 8 is a view to show the formation of the halftone data.
Figure 7:
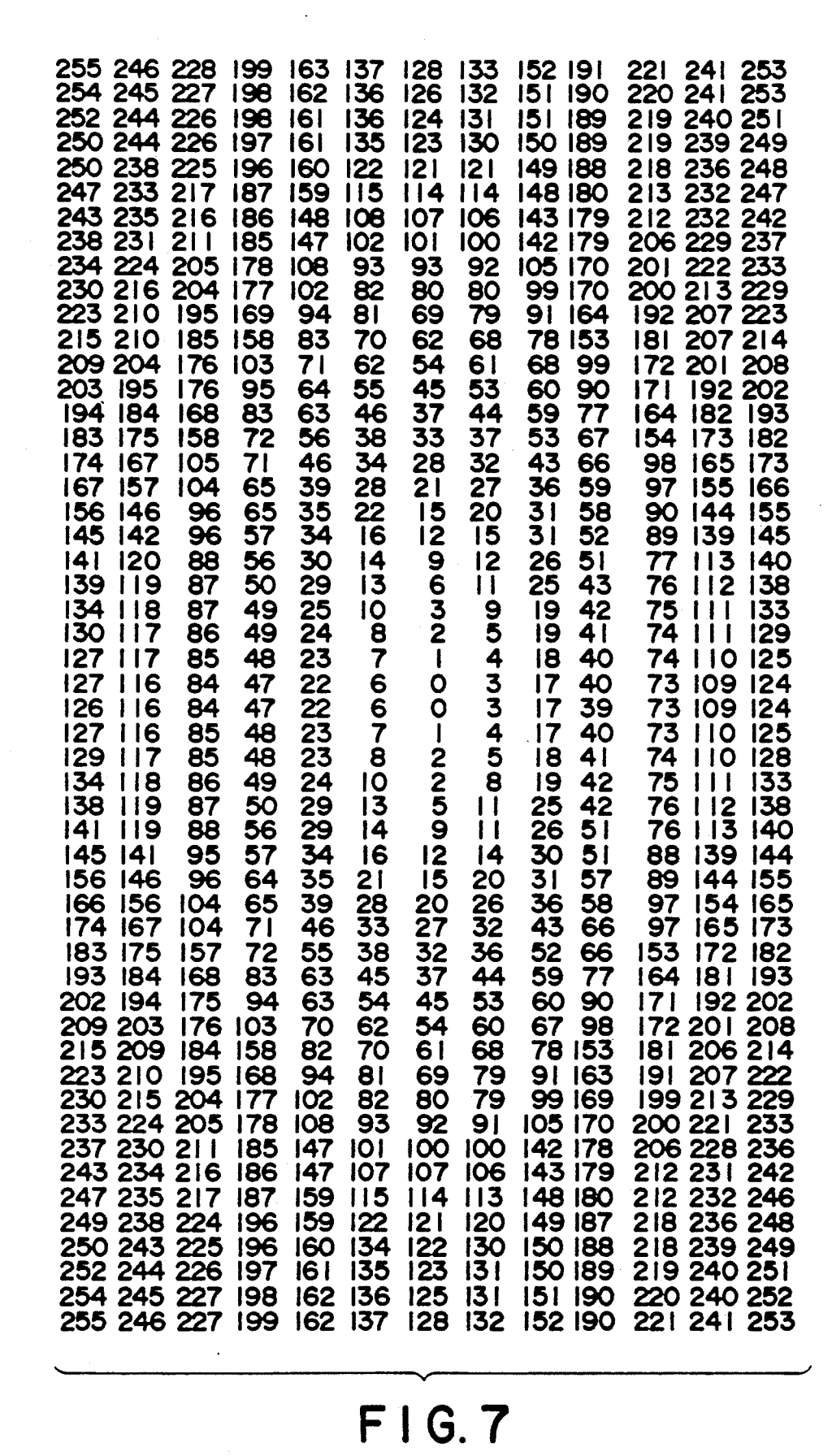

The synchronizing signal generator 50 includes grids 56 with a large number of slits 54 which are arranged at an even interval along the scanning direction of the synchronizing laser beam $L_1$, and the synchronizing laser beam $L_1$ is guided through a mirror 58 toward the grids 56. A condensing rod 57 is provided behind the grids 56 so that the synchronizing laser beam $L_1$ is passed through the condensing rod 57, guided to photodetectors 60a and 60b at both ends thereof, and converted into electric signals. The electric signals obtained from the photodetectors 60a and 60b are multiplied by a PLL (phase locked loop) multiplier 62 and supplied to an output controller 64 as a synchronizing signal. The output controller 64 controls the LD driver 33 based on the image signal and the synchronizing signal. As shown in the Table 2, if the number of screen lines and screen angle are determined, it becomes possible to design a dot pattern. FIG. 7 shows an embodiment of such a dot pattern of 175 lines and an angle 0°. For each of the combinations of the screen line number with screen angle shown in Table 2, a halftone pattern (template data) is designed to be used for formation of a halftone screen. The template data are usually stored in a floppy disk or a ROM of an image output section, and at the time of selecting the screen line number and the screen angle, the scanning pitch p is selected from the Table 2 of the image output section. Then, circuits are set to be controlled with the selected pitch p. The template data which are stored therein are read out in a RAM zone. As shown in FIG. 8, by using the read-out template data 1 and the image signals 2, halftone data 3 are formed. In FIG. 8, the template data 1 is compared with the image data 2, and when the image data 2 is larger than the other, it outputs "1". When the image data 2 is smaller, it outputs "0". Thus, the halftone data 3 are obtained. Corresponding to the halftone data 3, light is modulated to expose the photosensitive material and to obtain halftone plates.

Referring to the attached drawings, description is now given to a method of forming a halftone screen to which this invention method is applicable.

Figure 9:
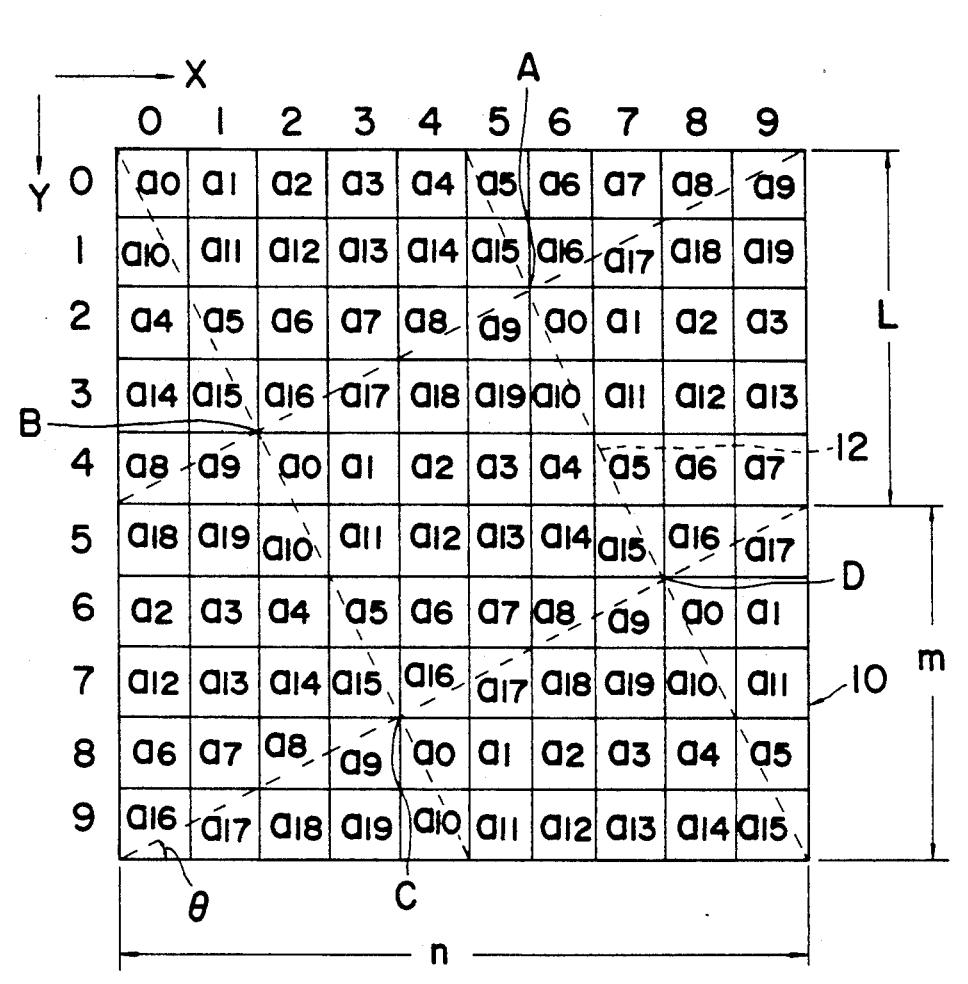

FIG. 9 shows an embodiment of halftone screen signals, and more particularly a basic periodic section 10 of the halftone screen comprising 100-halftone data. In the figure, the basic periodic section 10 has a halftone portion 12 which is surrounded by the points A through D and inclined at the screen angle of $\theta$.

In order to make the basic periodic section 10 including the halftone portion 12 a minimum unit of a halftone screen, the screen angle $\theta$ should be set at a rational tangent defined by the following equation wherein n and m are integers.

$$\tan \theta = \frac{m}{n} \qquad (22)$$

Since the basic periodic section 10 should be formed with an integer number of the halftone data in the directions X and Y, the relation should hold as follows.

$$n.L = \alpha.P \qquad (23)$$

The reference letters n.L denote the length in the directions either of X or Y when the side of a square in either of the directions X or Y forming the halftone portion 12 is L, P is the width of a halftone block formed with one halftone data, and $\alpha$ is the number of the halftone data in either of the directions X or Y forming the basic periodic section 10.

The data at the points A through D forming the halftone portion 12 should be formed with the same halftone data in order to prevent cyclic patterns from being generated on a reproduced image. More particularly, it is necessary to arrange the halftone data in the number of an integer in the directions X and Y between the point A and B comprising the halftone portion 12. If it is assumed that the distance in the direction Y between the point A and the point B is represented by the letter l, and if $\gamma$ is an integer, the relation holds as follows.

$$l = \gamma P \qquad (24)$$

The similar relation is obtained in the direction of X. The distance l can be expressed as below.

$$l = L \cdot \cos^2 \theta \cdot \tan \theta \qquad (25)$$

From the equations (23), (24) and (25), the relation expressed by the equation (26) is obtained.

$$\frac{\gamma}{\alpha} = \frac{\tan \theta}{n \cdot (1 + \tan^2 \theta)} \qquad (26)$$

When the relation of the equation (26) holds, by repeatedly forming the halftone data between the points A and B in the direction Y, the basic periodic section 10 can be formed. More particularly, if the halftone data number is determined to form the basic periodic section 10 in a manner to arrange halftone data of integers between the points A and B, the basic periodic section 10 can be expressed with the halftone data with the amount of the data $\gamma/\alpha$. For instance, in the case shown in FIG. 9, as the relation of $\tan \theta = \frac{1}{2}$ and n=2, $\gamma/\alpha$ becomes 1/5, and the basic periodic section 10 by 20-halftone data $a_0$ through $a_{19}$ which is one fifth of the total data amount.

Based on the halftone data $a_0$ through $a_{19}$ forming a basic periodic section 10 shown in FIG. 9, a method of forming a halftone gradation image signal from a continuous tone image signal will be explained.

Figure 10:
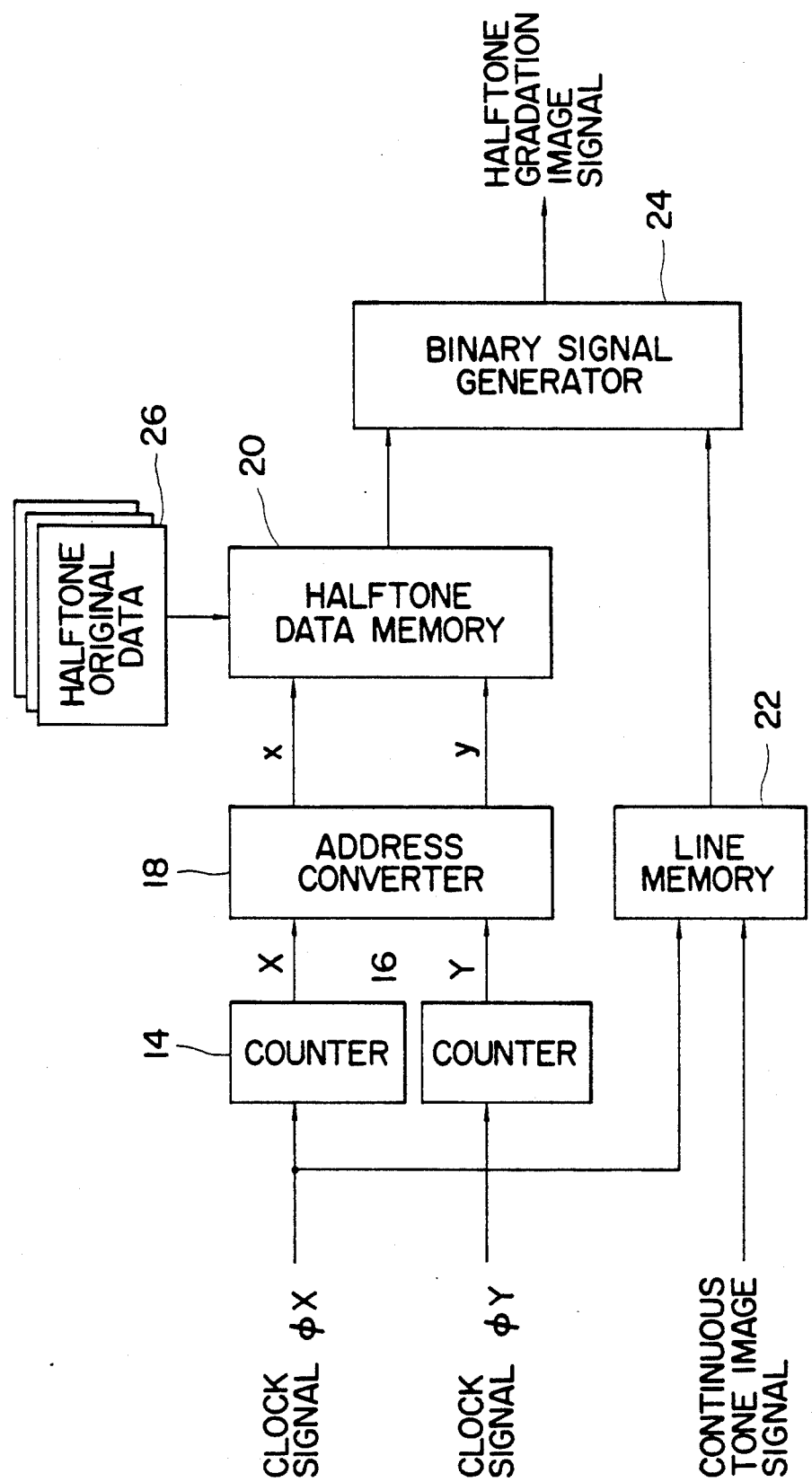
FIG. 10 is a block diagram to show a circuit which forms the halftone images signal.
Figure 11:
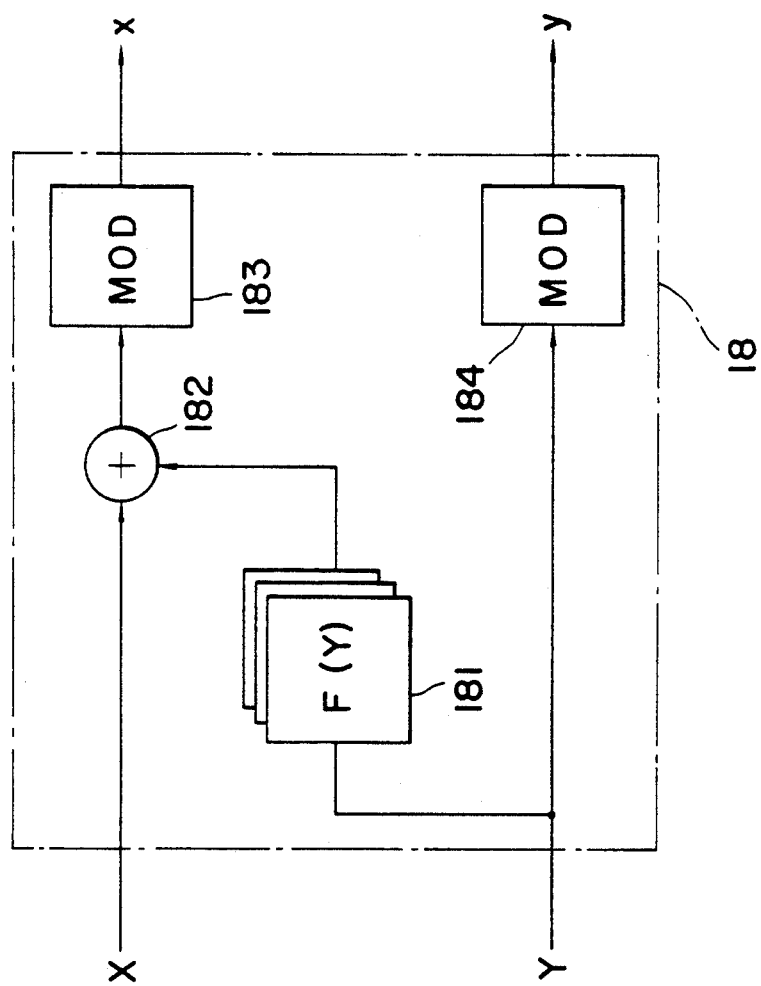
FIG. 11 is a block diagram to show details of an embodiment of an address converting section 18.

FIG. 10 shows an embodiment of the circuit for forming the halftone gradation image signal. The halftone gradation image signal generating circuit comprises two counters 14 and 16, an address converter 18, a half-tone data memory 20, a line memory 22 and a binary signal generator 24. The halftone data memory 20 stores desired data out of the plural halftone original data 26 predetermined in accordance with the levels of the screen angle $\theta$ and the halftone resolution which have been transferred. The counter 14 counts the clock signal $\phi_x$ in the main scanning direction of the continuous tone image and supplies the result as an address signal X to the address converting section 18. The counter 16 counts the clock signal $\phi_y$ in the auxiliary scanning direction of the continuous tone image and supplies the result as an address signals Y to the address converter 18. The address converter 18 converts the address signals (X, Y) of the halftone data at the basic periodic section 10 into the address signals (x, y) at the halftone data $a_0$ through $a_{19}$ which have been stored in the halftone data memory 20. FIG. 11 shows its structure. The address converter 18 includes a remainder calculating section 183 which is supplied with the address signal X via an adder 182 and a remainder calculating section 184 which is supplied with the address signal Y. The adder 182 is supplied with an addition signal F(Y) which is selected by the address signal Y from an off-set table 181. The off-set table 181 comprises plural data which are determinable combinations of the screen angle $\theta$ and the level of the halftone resolution in a manner similar to the halftone original data 26. The remainder calculating section 183 calculates the address signal X based on the arithmetic equation below.

$$x = \text{MOD} (X + F(Y), N_x) \qquad (27)$$

wherein the numeral $N_x$ denotes the number of the halftone data in the direction n of X.

The remainder calculating section 184 calculates the address signal y based on the arithmetic equation below wherein $N_y$ denotes the number of the halftone data in the direction of Y.

$$y = \text{MOD}(Y, N_y) \quad (28)$$

The line memory 22 is supplied with the continuous tone image signal of the main scanning direction and the clock signal $\phi_x$, and the outputs from the line memory 22 and the halftone data memory 20 are respectively supplied to the binary signal generator 24. The binary signal generator 24 compares the halftone data with the image signal, and outputs the results as the halftone image signal.

Description will now be given to the case where the continuous tone image signal is to be converted into halftone image signal by using the basic periodic section 10 shown in FIG. 9.

Figure 12:
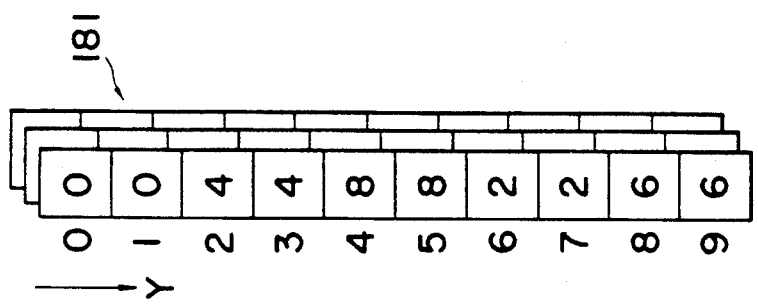
FIG. 12 is a view to show an embodiment of an offset table.

The halftone original data 26 stores the halftone data corresponding to the screen angle $\theta$ and the level of the halftone separation. Out of such halftone data are selected the halftone data $a_o$ through $a_{19}$, and are loaded at the address (x, y) of the halftone data memory 20. In this case, the address (x, y) is set within the scope ranging from (0, 0) to (9, 1). Therefore, when an address signal (X, Y) is input to the address converter 18 from the counters 14 and 16 based on the clocks signals $\phi_x$ and $\phi_y$, the address converter 18 converts them into the address halftone data $a_o$ through $a_{19}$. In other words, if the relation of (X, Y) = (0, 0) holds, since the addition signal F(Y) is set at "0" in the off-set table 181 in FIG. 12, the output signals x, y from the remainder calculating section 183 and 184 become "0" respectively in accordance with the equations (27) and (28). The address converter 18 accesses the halftone data $a_o$ at the address of (x, y) = (0, 0) from the halftone data memory 20, and supplies the data to the binary signal generator 24. When the address signals (X, Y) from the counters 14 and 16 are (0, 2), the addition signal F(Y) becomes "4" according to FIG. 12. This causes (x, y) to become (4, 0) from the above equations (27) and (28). Therefore, the address converter 18 selects the halftone data $a_4$ out of the halftone data $a_o$ through $a_{19}$ which have been stored in the halftone data memory 20, and supplies to the binary signal generator 24. In the manner similar to the above, the halftone data $a_o$ through $a_{19}$ are supplied respectively to the binary signal generator 24.

The binary signal generator 24 is supplied with the continuous tone image signal stored in the line memory 22 based on the clock signal $\phi_x$ in addition to the halftone data $a_o$ through $a_{19}$. The binary signal generator 24 compares the halftone data $a_o$ through $a_{19}$ with the continuous tone image signal, and outputs the result as the halftone image signal which is in the form of ON/OFF signals. The halftone image signal is converted into an optical signal such as laser beam, and irradiated by the system shown in FIG. 6 on a film to form the halftone images.

As stated in detail in the foregoing statement, the method of forming a halftone screen according to this invention can expose and scan a light spot of a predetermined size at a predetermined pitch and controls the number of pitches to obtain a desirable number of screen lines when the method is used to form a multi-color separated halftone gradation image which is a combination of all the four colors of C, M, Y and K or of more than two colors out of them. Since the apparatus for control can be simplified by such features, the method can be applied to color scanners of a flat-bed type without using a zooming mechanism.

It should be understood that many modifications and adaptations of the invention will become apparent to those skilled in the art and it is intended to encompass such obvious modifications and changes in the scope of the claims appended hereto.

What is claimed is:

1. A method for forming halftone screens to prepare a multi-color separated halftone gradation image which is printable and reproducible by superposing an image signal obtained by scanning an original comprising continuous-tone color images with a halftone screen signals generated electronically, which comprises the steps of exposing and scanning a light spot of a predetermined size at a predetermined scanning pitch to form halftone dots, and changing said scanning pitch so as to obtain an arbitrary screen line number, in order to avoid generation of Moire patterns, wherein reproduction for printing is performed by four plates of C, M, Y and K, halftone angle 0° is allotted to the Y plate and halftone angles 15°, 45°, and 75° respectively are allotted to the C, M and K plates, and wherein a relation $a = (m^2 + n^2)/n \cdot \gamma$ is held when a screen angle is a rational number m/n and a and $\gamma$ are constants of integer, and a relation $a_0 = (n_0 - m_0) \cdot a_1$ is held when $n_0$, $m_0$ ($<n_0$), $a_0$, $a_1$ are integer, it is (m, n, a) = ($m_0$, $n_0$, $a_0$) at near the halftone angle 15°, it is (m, n, a) = ($n_0$, $m_0$, $a_0$) at near the halftone angle 75° and it is (m, n, a) = (1, 1, $a_1$) at the halftone angle 45°.

2. A method as claimed in claim 1, wherein a scanning pitch is 11.25 μm.

3. A method as claimed in claim 1, wherein the rational number m/n is ⅓ and the near halftone angle has a relation which is symmetrical from the angle 45° and comprises as real angles either of two angles 18.4° and 71.6°.

4. A method for forming halftone screen to prepare a multi-color separated halftone gradation image which is printable and reproducible by superposing an image signal obtained by scanning an original comprising continuous-tone color images with a halftone screen signal generated electrically which comprises the steps of:

preparing screen angle m/n of a rational number and constants a and $\gamma$ of integer;

obtaining a relation $a = (m^2 + n^2)/n \cdot \gamma$;

preparing integers $n_0$, $m_0$ ($<n_0$), $a_1$, obtaining a relation (m, n, a) = ($m_0$, $n_0$, $a_0$) of near halftone angle 15°, a relation (m, n, a) = ($n_0$, $m_0$, $a_0$) of near halftone angle 75° and a relation (m, n, a) = (1, 1, $a_1$) of the halftone angle 45°;

preparing a scanning pitch p;

obtaining a period K of Moiré pattern as $K = p \cdot a_0 / \{\sqrt{2}(n_0 - m_0)\}$;

obtaining a relation $a_0 = (n_0 - m_0) \cdot a_1$ in accordance with a condition that a period of a primary Moiré pattern is perfectly equal to a period of 45° screen; and calculating a screen line number which is usable as a predetermined value for said scanning pitch p.

5. A method as claimed in claim 4, wherein said scanning pitch p is 11.25 μm.

6. A method for forming halftone screen to prepare a multi-color separated halftone gradation image which is printable and reproducible by superposing an image signal obtained by scanning an original comprising continuous-tone color image with a halftone screen signal generated electronically, which comprises the steps of exposing and scanning a light spot of a predetermined size at a predetermined scanning pitch to form halftone dots, changing a pixel number of a pitch unit so as to obtain an arbitrary screen line number, and changing the pitch at the screen line number where Moire pattern is formed so that no Moire pattern is formed for all screen line numbers, wherein the scanning pitch is 22.5 μm for screen line numbers 65 and 85, the scanning pitch is 12.5 μm for screen line numbers 100, 120, 150 and 200, and the scanning pitch is 11.25 μm for screen line numbers 133 and 175.

7. A light beam scanning apparatus for forming halftone screen to prepare a multi-color separated halftone gradation image which is printable and reproducible by superposing an image signal obtained by scanning an original, comprising continuous-tone color images, with a halftone screen signal generated electrically, which comprises a first laser diode for emitting a synchronizing laser beam, a second laser diode for emitting a recording laser beam, a galvanometer for inputting the synchronizing laser beam and the recording laser beam through a collimator and a mirror, a synchronizing signal generator and an image recording section for inputting laser beams reflected and deflected by said galvanometer, a PLL multiplier for outputting a synchronizing signal by inputting an electric signal from said synchronizing signal generator, and an output controlling section for driving the second laser diode in accordance with the image signal and the synchronizing signal.

8. A light beam scanning apparatus as claimed in claim 7, wherein the synchronizing laser beam and the recording laser beam are deviated by a predetermined angle and are inputted to said galvanometer.

9. A light beam scanning apparatus as claimed in claim 7, wherein an fθ lens is provided between said galvanometer and said synchronizing signal generator, said image recording section.

10. A light beam scanning apparatus as claimed in claim 7, wherein said synchronizing signal generator comprises grids with large slits which are arranged at an even interval along the scanning direction of the synchronizing laser beam, a condensing rod which is provided behind said grids, and photodetectors which are provided at both ends of said condensing rod.

* * * * *